US006632052B2

(12) United States Patent
Moeri et al.

(10) Patent No.: US 6,632,052 B2
(45) Date of Patent: Oct. 14, 2003

(54) BEVEL GEAR MANUFACTURING METHOD

(75) Inventors: Peter Moeri, Safnern (CH); Walter Simon, Orpund (CH)

(73) Assignee: Lambert AG, Safnern (CH)

( * ) Notice: Subject to any disclaimer, the term of this patent is extended or adjusted under 35 U.S.C. 154(b) by 0 days.

(21) Appl. No.: 10/156,389

(22) Filed: May 28, 2002

(65) Prior Publication Data

US 2002/0192044 A1 Dec. 19, 2002

Related U.S. Application Data

(63) Continuation of application No. PCT/CH00/00213, filed on Apr. 12, 2000.

(51) Int. Cl.[7] .............................. B23F 9/10; B23F 5/20; B23F 5/00
(52) U.S. Cl. ............................ 409/26; 409/38; 409/51; 409/1; 409/50
(58) Field of Search ................................ 409/1, 26, 38, 409/43, 50, 51, 25, 27, 28, 29, 30

(56) References Cited

U.S. PATENT DOCUMENTS

| | | | | | |
|---|---|---|---|---|---|
| 4,183,703 | A | * | 1/1980 | Kotthaus | 409/25 |
| 4,565,474 | A | * | 1/1986 | Charles | 409/51 |
| 4,663,721 | A | * | 5/1987 | Herscovici | 409/15 |
| 4,799,337 | A | * | 1/1989 | Kotthaus | 409/29 |
| 4,910,922 | A | * | 3/1990 | Kotthaus et al. | 409/29 |
| 5,895,180 | A | * | 4/1999 | Stadtfeld | 409/26 |

FOREIGN PATENT DOCUMENTS

| | | |
|---|---|---|
| DE | 104 582 C | 8/1898 |
| DE | 21 39 844 A | 2/1973 |
| DE | 41 12 122 A | 10/1991 |
| DE | 41 22 459 C | 6/1992 |
| GB | 02010 A | 8/1866 |
| GB | 1 420 641 A | 1/1976 |

OTHER PUBLICATIONS

A. Galassini: "Kegelraderschneidmaschinen ohne Schablone" Werkstattstechnik, Zeitschrift Fur Industrielle Fertigung, 1913, Seiten 718–720, XP002145027, Berlin, Germany.
A.K. Thomas: "Zahnradherstellung Teil 2: Kegelrader", Carl Hansr Verlag, 1996, XP002145029.
"Berichte der Schriftleitung" Werkstattstechnik, Nr. 5, 1924 Seiten 156–167, XP 002145028.

* cited by examiner

*Primary Examiner*—A. L. Wellington
*Assistant Examiner*—Dana Ross
(74) *Attorney, Agent, or Firm*—Pearne & Gordon LLP

(57) ABSTRACT

Method for machining right toothed bevel gears, wherein:
  at least a part of the tooth flanks is milled with a disc milling cutter,
  the left tooth flanks are milled at a different time than the right tooth flanks, the machined bevel gear is rotated by an angle between the milling process of at least one left tooth flank and the milling process of at least one right tooth flank, the inclination of the axis of the disc milling cutter remains unchanged during the milling process of said gear, said angle being not a multiple of the base pitch $\alpha$.

15 Claims, 8 Drawing Sheets

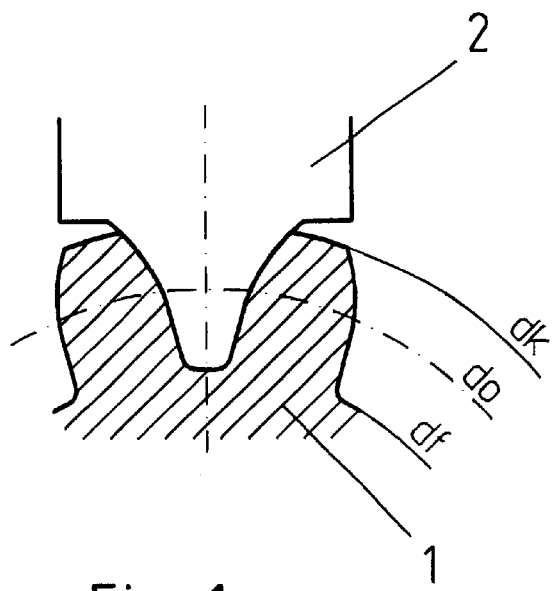
Fig. 1
PRIOR ART
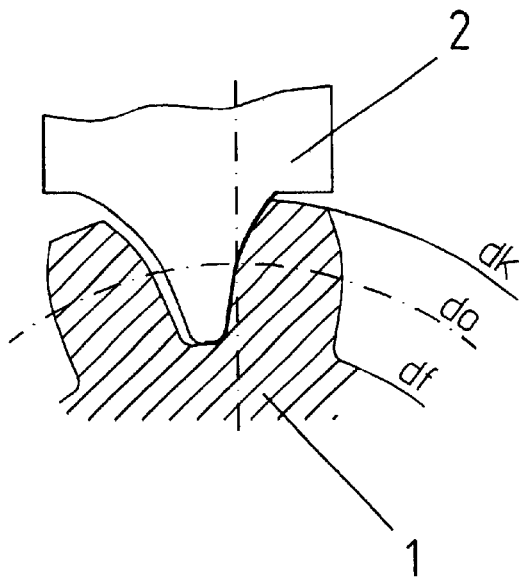 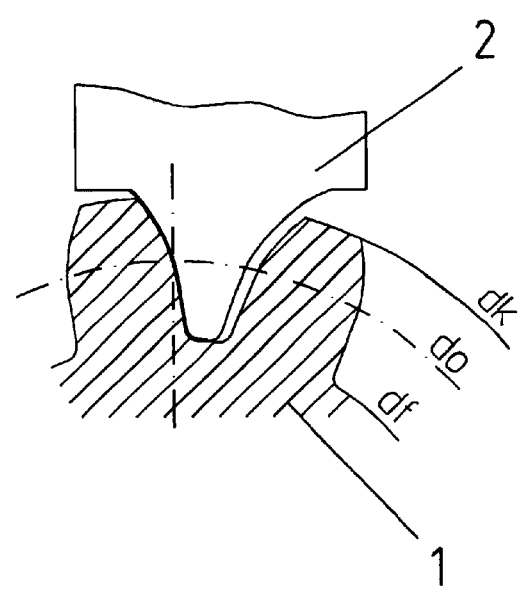
Fig. 2 　　　　　　　　　Fig. 3
PRIOR ART 　　　　　　PRIOR ART

BEVEL GEAR MANUFACTURING METHOD

RELATED APPLICATIONS

The present invention is a continuation of PCT/CH00/00213, filed Apr. 12, 2000, which claims priority of Swiss patent application CH2193/99 filed Dec. 1, 1999. The contents of those applications are incorporated herein by reference.

BACKGROUND OF THE INVENTION

The present invention concerns a method for the manufacturing of bevel gears, in particular a method for bevel gear milling and bevel gear grinding.

FIG. 1 shows a known method for manufacturing bevel gears with a one-tooth milling cutter. With this method, the milling tooth simultaneously cuts two tooth flanks. The gear or the milling head then rotates by an angle α equal to the pitch between the points of contact of two successive teeth and the next two tooth flanks are cut.

Although this method is fast, it does not guarantee a good quality of the bearing surface. The bevel gears manufactured according to this method are therefore noisy and hardly efficient.

It has therefore been proposed to mill each tooth flank individually with a modified tool. A corresponding known method generating the correct tooth profile both at the outside diameter as well as at the inside diameter is illustrated in FIGS. 2 and 3.

This method uses two tools or a tool 2 with two cutting teeth. The first tool (respectively the tool's first tooth) mills the left tooth flank whilst the right tooth flank is milled by the second tool resp. tool tooth. Along the contact path, all the tooth flanks are cut one after the other. With this method, bevel gears of small and large size pitch have already been manufactured.

This method can only be used with special milling machines allowing an inclination $\delta_0$ of the axis of the gear cutter. Such machines are however slow, expensive and complicated.

DE-C 104 582 describes another method for machining spur toothed bevel gears, wherein the tooth flanks are milled with a disc milling cutter. The left tooth flanks are milled at a different time than the right tooth flanks; the bevel gear is rotated between the milling process of the left tooth flank and the milling process of the right tooth flank.

Although this method allows a high production rate, it is not possible with this form cutter to generate all theoretical involutes between the outside and the inside bevel gear diameter. The quality of the bearing surface of the bevel gears manufactured with this machine is thus insufficient for high standards.

Another method for generating bevel gears with crowned tooth flanks has been described in patent DE-C1-4122459.

SUMMARY OF THE INVENTION

It is therefore an aim of this invention to propose a new and improved bevel gear manufacturing method, in particular a new and improved bevel gear milling method and bevel gear grinding method.

It is another aim of this invention to propose a new bevel gear milling method that can also be used with inexpensive milling machines with which the axis of the gear cutter cannot be inclined.

It is another aim of this invention to propose a new bevel gear milling method that is faster than the known methods without impairing the quality of the bearing surface.

It is another aim of this invention to propose new tools for carrying out the method, in particular new milling heads, new grinding discs and new control programs.

According to the present invention, these aims are achieved in particular through the characteristics of the independent claims. Further advantageous embodiments are moreover described in the dependent claims and in the description.

In particular, these aims are achieved in that each tooth flank is milled individually with a disc milling cutter. Each tooth flank is milled following the path of contact and accurately in the center. The gear tooth base has the same depth along the pitch circle. In-between the milling process of at least a left tooth flank and the milling process of at least a right tooth flank, the machined bevel gear is rotated by an angle that is not a multiple of the pitch α between the points of contact of two successive teeth (base pitch). The inclination of the axis of the disc milling cutter remains unchanged during the milling process of said gear.

An advantage of the present invention is that it is possible to load a CNC machine automatically so that multiple-machine operation is possible.

Another advantage of the invention is that a high production rate can be achieved and that the disc milling cutters have a long service life.

Another advantage of the invention is that the most cost-effective tooth length can be chosen.

Another advantage of the invention is that the tooth bearing can be corrected in length crowning and in depth crowning in order to achieve the most cost-effective running characteristics.

BRIEF DESCRIPTION OF THE DRAWINGS

Hereafter, preferred embodiments of the invention will be described in more detail with the aid of the attached figures, in which:

FIG. 1 shows the milling process according to a known method with a one-tooth milling cutter having an inclination γ.

FIGS. 2 and 3 show the milling process according to a known method with a single-start double-tooth milling cutter or with a single- or multiple-start multi-tooth milling cutter having an inclination γ.

DETAILED DESCRIPTION OF PREFERRED EMBODIMENTS

Although this description describes in particular the milling process of a bevel gear, the one skilled in the art will understand that similar steps can be carried out with the same machine also for the grinding of the bevel gear after its milling.

Figure 6:
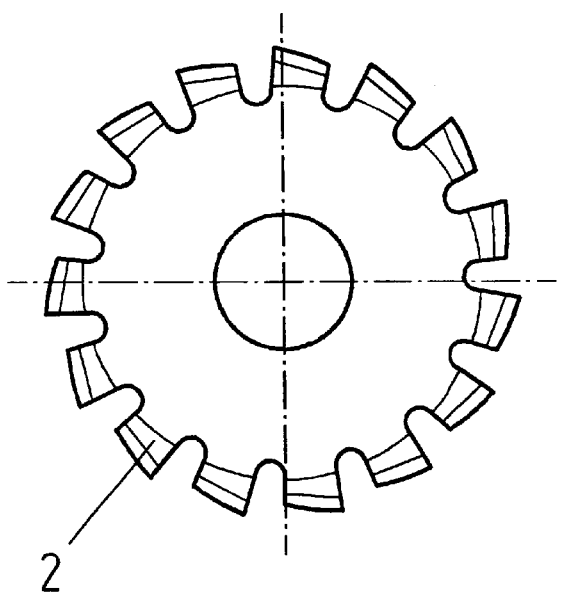
FIG. 6 shows a disc milling cutter according to the invention.

The principle underlying the method according to the invention is that each tooth flank is fashioned individually, as with the method of the FIGS. 2 and 3. However, instead of milling the work pieces with two tools or with a multi-tooth tool, for example a double-tooth tool, the disc milling cutter 2 according to the invention as represented in FIG. 6 is used.

Figure 4:
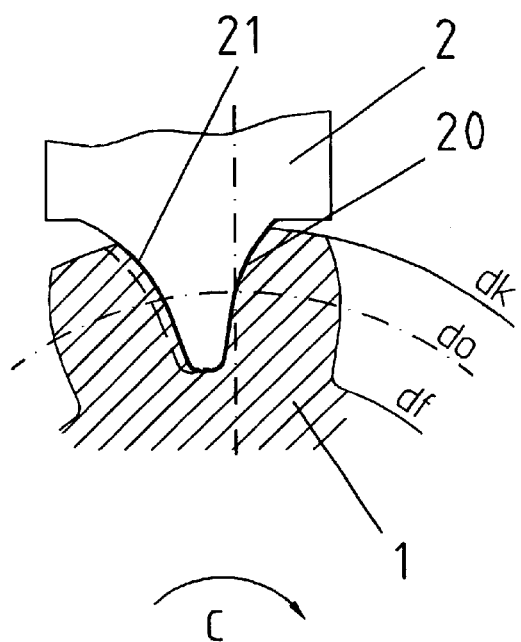
FIGS. 4 and 5 show the milling method according to the invention with a disc milling cutter according to the invention.
Figure 5:
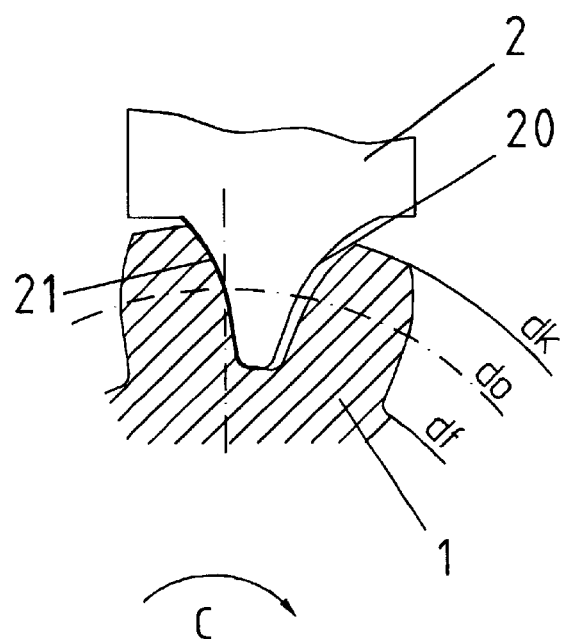

In a first step, represented in FIG. 4, all left flanks of the work piece are milled one after the other along the pitch circle, the work piece 1 being each time rotated by the base pitch α (i.e, by the pitch between the contact points of two successive teeth) or by a multiple of the base pitch (rotation of the C-axis of the head stock). Once all the left flanks have been milled, the work piece is rotated by a predefined angle that is not a multiple of α, in order to mill the right flanks with the other side of the disc milling cutter 2 (FIG. 5).

The one skilled in the art will understand that it would also be possible to first fashion all the right flanks and then the left flanks. It would also be possible to mill the left and the right flanks in any random sequence.

With this method, the tooth base has a constant depth along the pitch circle; the bearing surface and the running characteristics are good. The tooth length can be chosen according to the desired pitch size. Tests have for example been made with a tooth length of up to a quarter of the bevel length.

Figure 7:
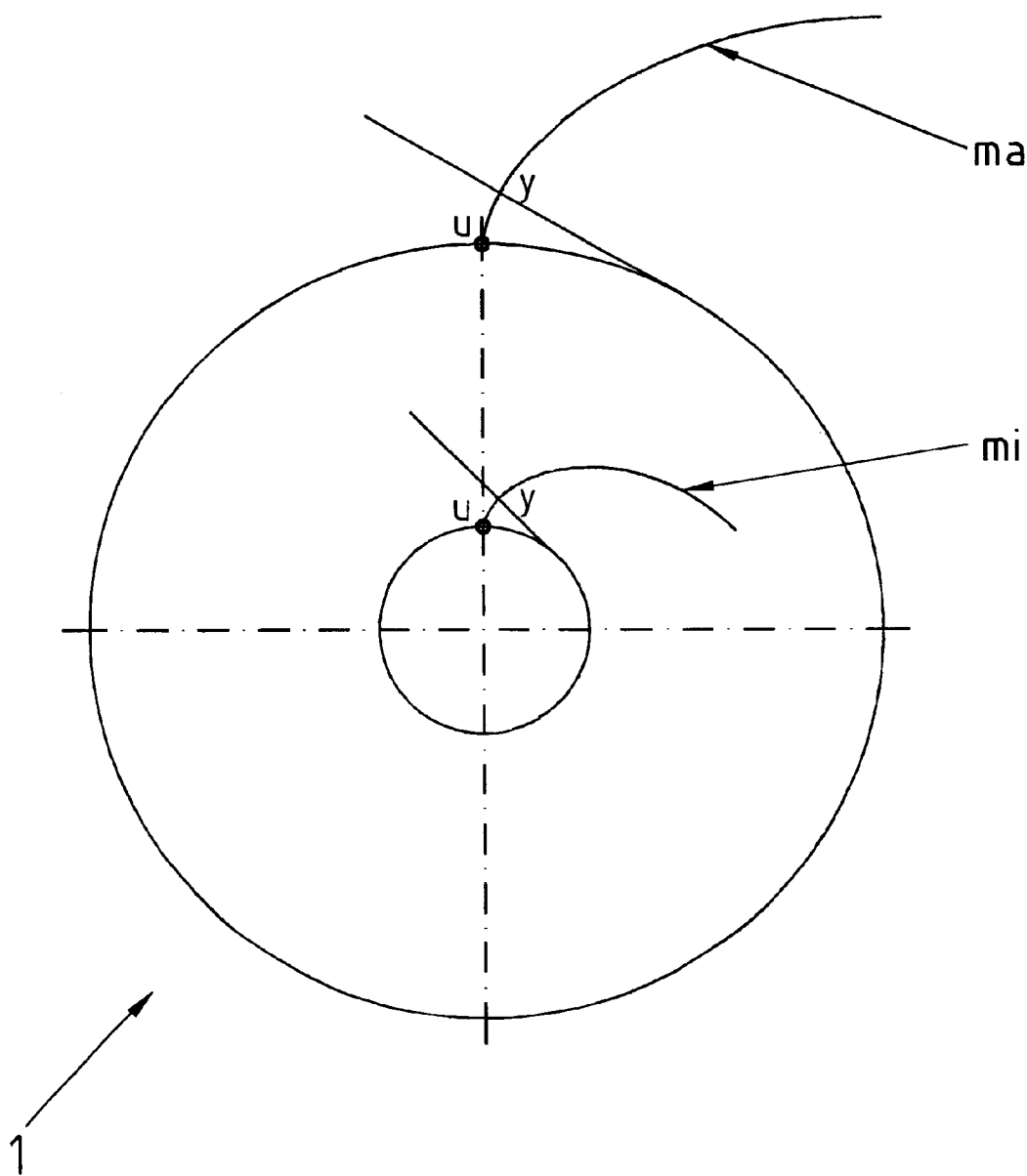
FIG. 7 shows a comparison of the involutes at the inner circle and at the outer circle of the bevel gear.

It is however not possible to generate with a form cutter all theoretical involutes between the outside and the inside bevel gear diameter. The difference of the radius curvature of the involutes at the inner (small) and the outer (large) base circle diameter is illustrated in FIG. 7. The curve $m_a$ shows the outer involute whilst the inner involute is represented by the curve $m_i$.

In order to achieve the optimal bearing surface and good gear meshing (according to the pitch size), the profile angle must be adjusted. According to the invention, this correction can be achieved without modifying the form cutter 2, but merely through an angular displacement of the bevel gear around the C-axis and/or through a simultaneous axial displacement of the disc milling cutter over the distance ΔY along the Y axis.

Figure 8:
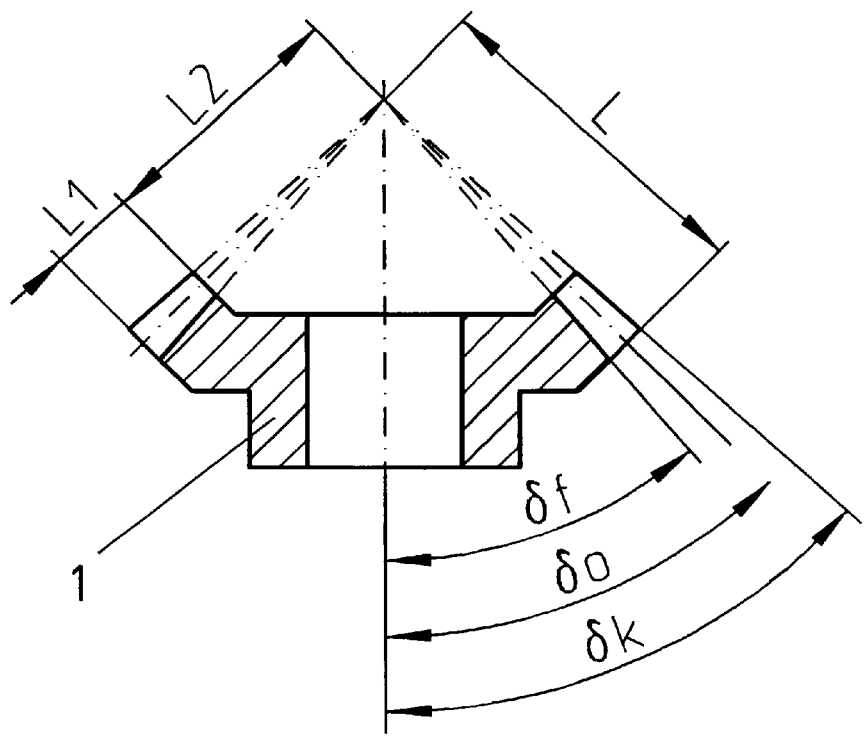
FIG. 8 shows a cross section of the manufactured bevel gear.
Figure 9:
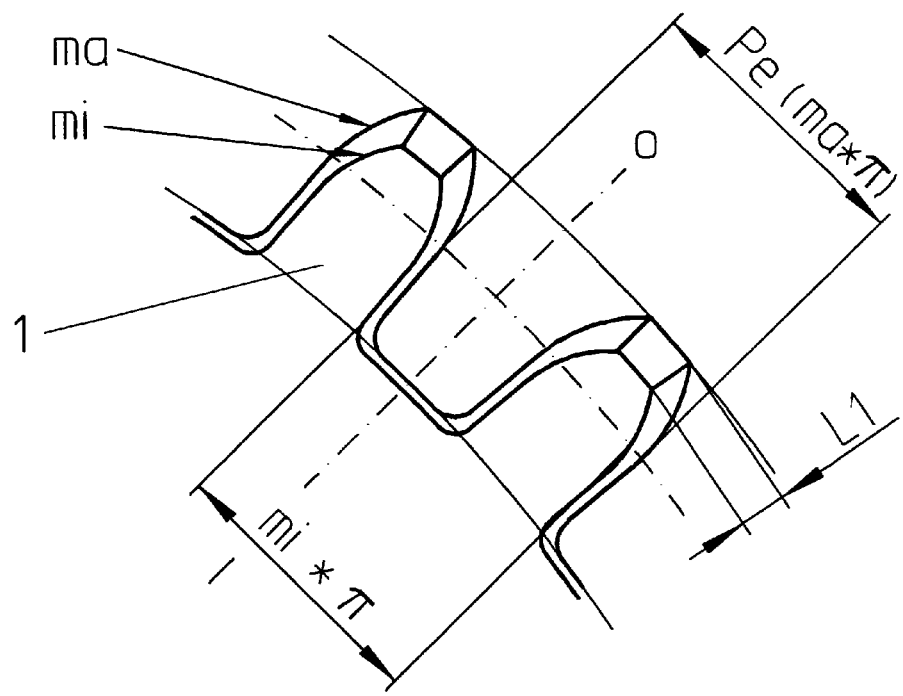
FIG. 9 shows two teeth of the manufactured bevel gear.
Figure 10:
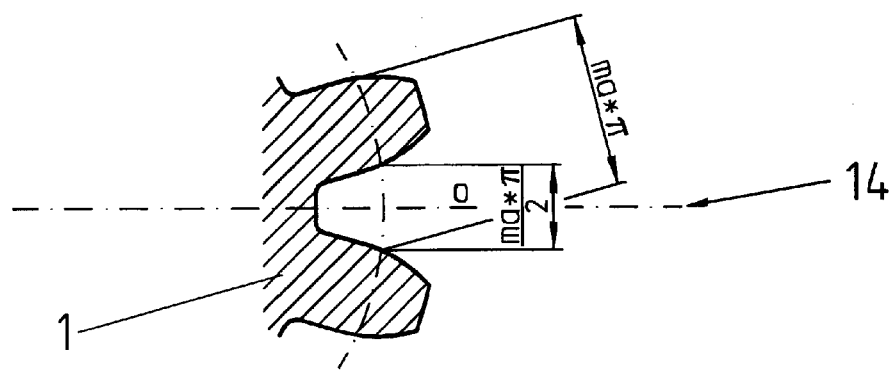
FIGS. 10 to 12 show the rotational movement ΔC of the work piece and the axial displacement by ±ΔY/2 of the milling head between the milling process of a left tooth flank and the milling process of a right tooth flank.

FIG. 8 shows a cross section of the manufactured bevel gear 1, of which two teeth have been enlarged and are represented in FIGS. 9 and 10. The tooth length is identified by the reference L1 whilst the bevel length bears the reference L. δf is the base angle, δk the head angle and δ₀ the angular pitch. The inner pitch size is $m_i$ and the outer pitch size $m_a$ whilst the circular pitch corresponds to Pe.

The left flanks are milled in a first phase (FIG. 11) with the work piece axis in the position 14 (position 0) and with the disc milling cutter in the axial position −ΔY/2. The angular position of the work piece 1 is kα−ΔC/2, α being the base pitch and k being any integer. After the milling of each tooth flank, the work piece is rotated by an angle α; the disc milling cutter 2 remains in the same axial position −ΔY/2.

Once all the left flanks have been milled, the axis 24 of the disc milling cutter 2 is shifted into the axial position +ΔY/2. The work piece axis 14 remains in the position 0. Simultaneously, the work piece is rotated by an angle nα+ΔC (n being any integer) in order to work the right tooth flanks. The angle ΔC corresponds preferably to half of the base pitch α. The distance ΔY preferably equals the milling head tooth width in the reference circle $m_a$.

Figure 11:
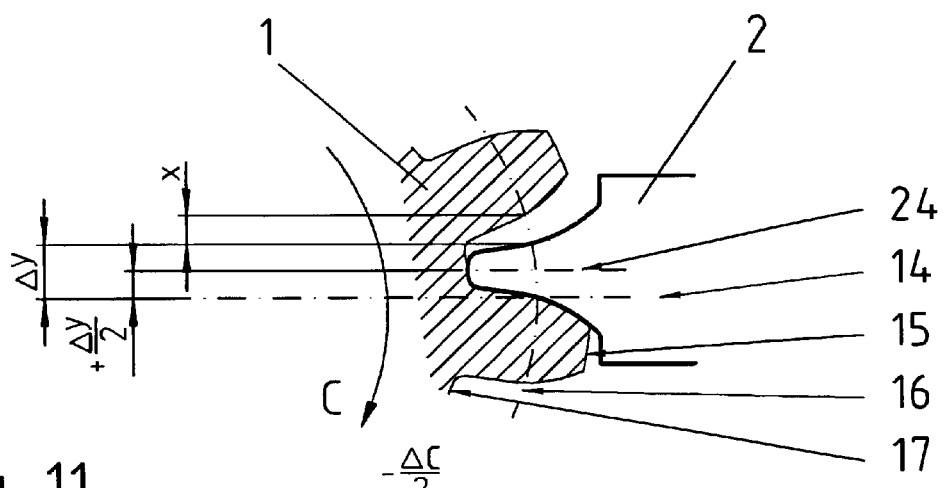
Figure 12:
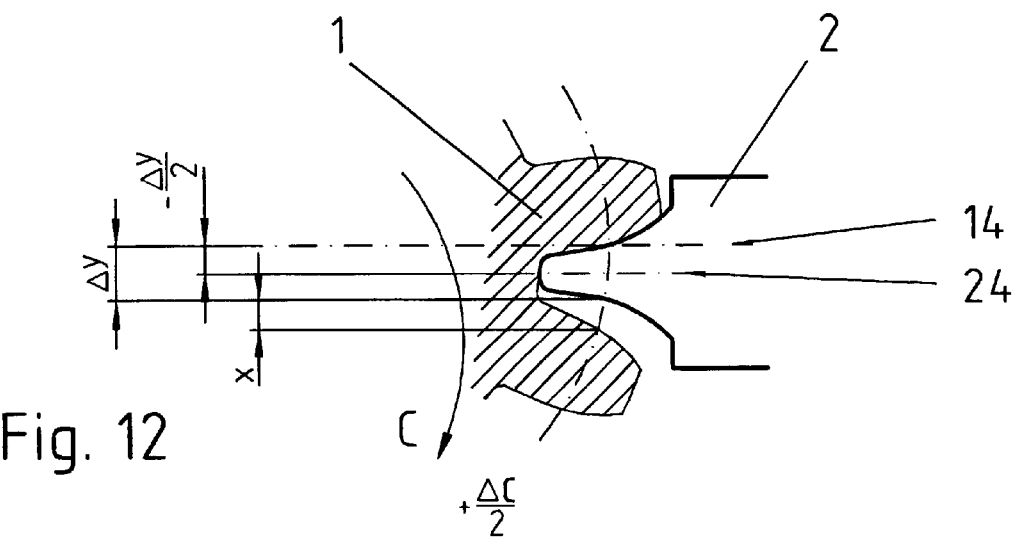

As can be observed among others in the FIGS. 11 and 12, the width of the disc milling cutter tooth according to the invention in the reference circle is smaller than half of the base pitch $m_a * \pi$, so that a gap x is created between the milling tooth and the work piece flank that is not being machined. The pitch size of the disc milling cutter corresponds to the pitch size of the outside diameter of the bevel gear 1; the milling head's involute is defined by $m_a$. For each pitch size, a certain disc milling cutter is to be used, preferably with a basic rack tooth profile according to DIN867. The disc milling cutter can for example be made of high-speed steel (HSS) or hard-metal (HM), the choice being determined in function of the material to be milled.

An advantage of this method is that the inclination of the disc milling cutter axis during the milling process remains unchanged; the disc milling cutter axis remains for example vertical. This method can therefore also be used with normal milling machines.

Figure 13:
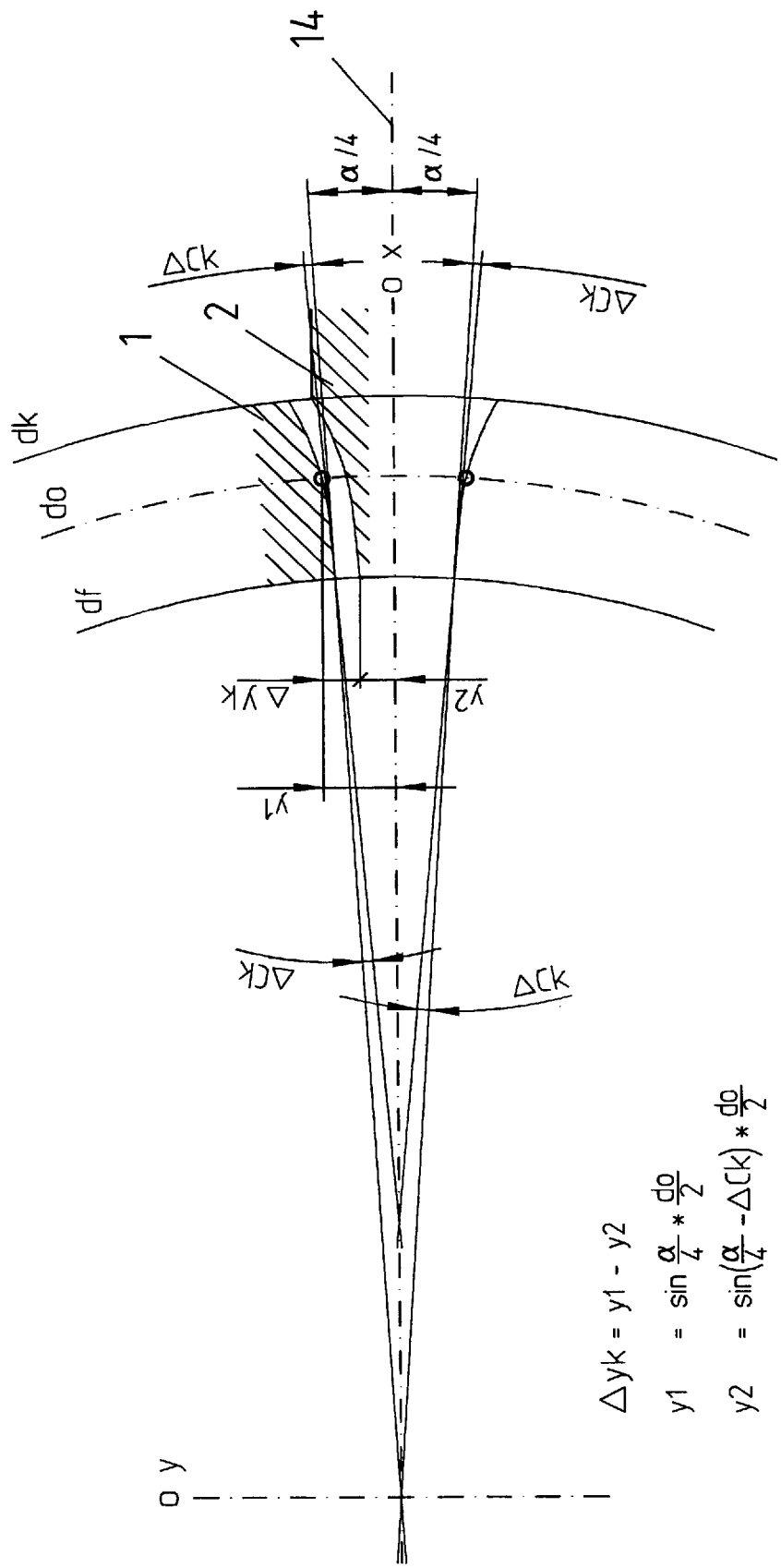
FIG. 13 shows the necessary profile correction (involute) through an axial movement $\Delta Y_k$ and a rotational movement $\Delta C_k$.

In order to guarantee a near perfect involute over the entire tooth length, the position of the form cutter 2 on the machine must be corrected. For this purpose, an additional axial movement $\Delta Y_K$ and an additional rotational movement $\Delta C_K$ (for example by 1,5°) must be carried out, as represented in FIG. 13.

The axial movement $\Delta Y_K$ concerns $y_1 - y_2$, where $$y1 = \sin \alpha/4 * d_0/2$$

and $y2 = \sin(\alpha/4 - \Delta C_K) * d_0/2$

The axial correction $\Delta Y_K$ can thus be determined as soon as the necessary rotation correction $\Delta C_K$ has been chosen.

Figure 14:
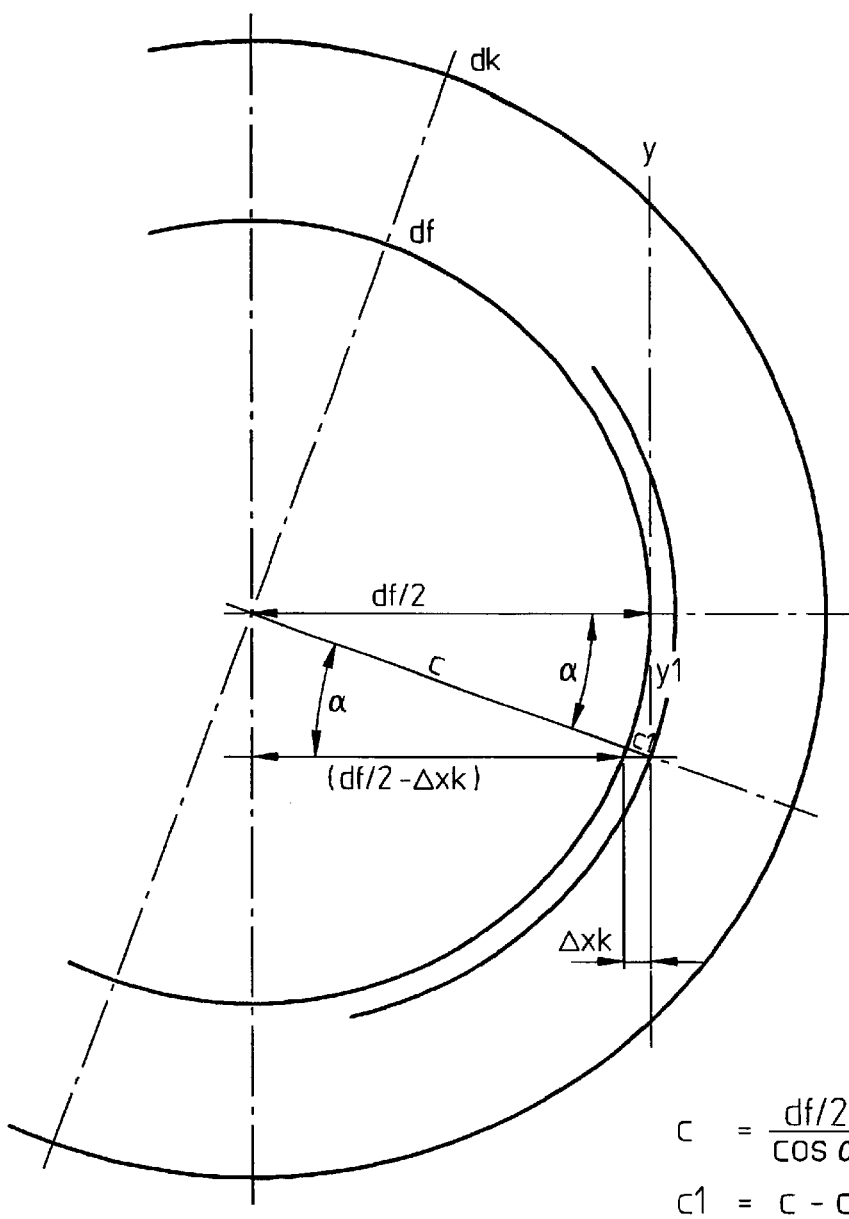
FIG. 14 shows the necessary profile correction (involute) through an axial movement $\Delta X_k$.

In order to guarantee a perfect involute, in a preferred embodiment of the invention a small additional movement $\Delta X_k$ of the X-axis is furthermore carried out, as can be seen in FIG. 14. With a diameter at the tooth base of df, one has:

$$df/2 - \Delta X_k = \cos \alpha * df/2,$$

so that $$\Delta X_k = df/2 - \cos \alpha * df/2$$

At medium and great speed (rotational speed, r.p.m.), running noise can sometimes be observed during the use of bevel gears. The cause can lie among others in assembly errors due to displacements of the gear axis (cant bearing) and poor rolling characteristics in the area of the tooth head.

In order to solve this problem, the teeth are preferably milled in length crowning and/or in depth crowning. With these corrections of the profile orientation, it is possible to optimize the tooth bearing, the running noise and the service life of the stressed tooth.

Figure 15:
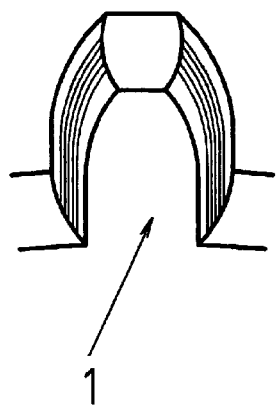
FIG. 15 shows diagrammatically a length crowned tooth.

A strongly exaggerated length crowned tooth is represented in FIG. 15. The length crowning is achieved through an additional rotational movement of the work piece axis C at constant feed rate along the axes Z and X. The position of the tooth bearing can be controlled by means of the milling program by controlling the C-axis accordingly.

Figures 16, 17:
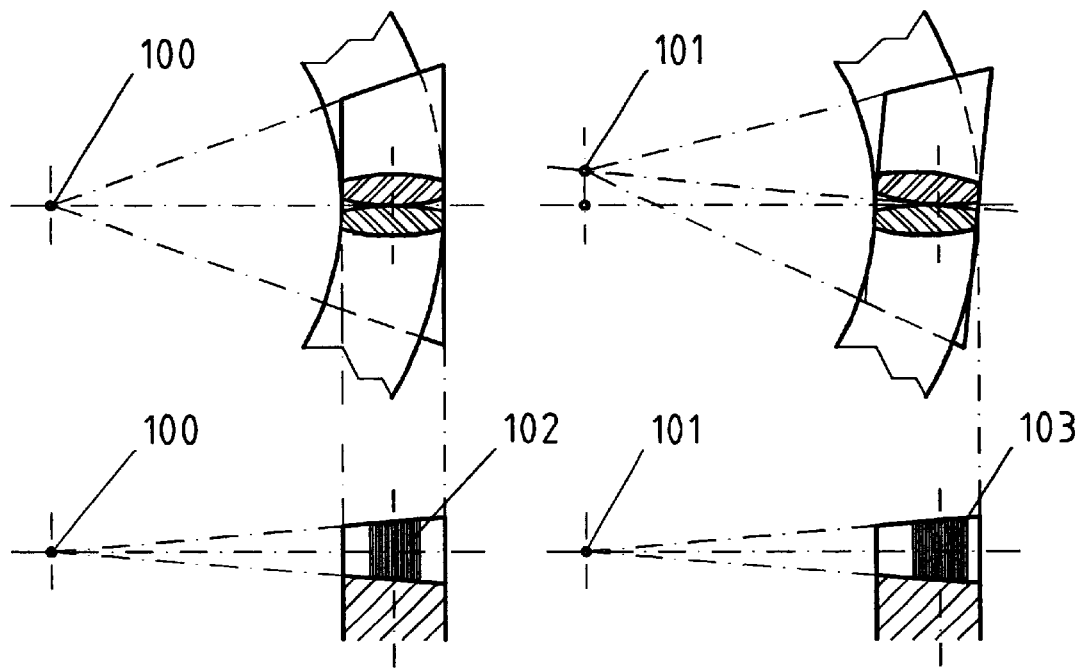
FIGS. 16 and 17 show diagrammatically the effects of the length crowning on the tooth bearing.

FIG. 16 shows the gear meshing of two bevel gear teeth, the cone generating point 100 being located at mid-height. As can be seen on the lower part of the Figure, the tooth bearing 102 is situated exactly in the middle of the tooth.

FIG. 17 shows the situation when the bevel tip 101 is displaced away from the center. The tooth bearing 103 is also shifted, but thanks to depth crowning remains still in a secure area.

Figure 18:
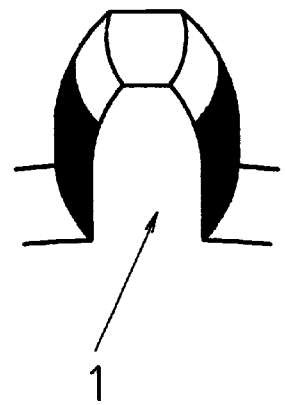
FIG. 18 shows diagrammatically a depth crowned tooth.

The head portion is preferably corrected by adjusting the disc milling cutter as can be seen in FIG. 18.

In order to achieve good rolling characteristics, the different involute profiles that are required for different number of teeth are preferably corrected on the gear cutting machine. In this manner, different pitch circle diameters can be taken into account.

The one skilled in the art will understand that through a continuous rotation of the C-axis and through a displacement along the Y-axis during the milling process, additional tooth profile corrections can be carried out. Likewise, a displacement of the bevel gear milling head along the X-axis and/or Z-axis can be carried out during the milling process for the manufacture of special bevel gears, for example of gears with another bevel angle than 45°.

With the method according to the invention, it is possible for bevel gears to be milled as well as finished on the same machine. For this purpose, the disc milling cutter is replaced by a grinding disc.

Apart from the earning opportunities provided through using the method, it is also possible to commercialize data carriers (for example magnetic and/or optical media carriers) with software programs for this method that can be executed by data processing means (for example by a Fanuc 16i (trademark) control system) in a milling machine (for example a gear hobbing machine of the type 100 CNC, 7500 CNC or 9500 CNC). It is also possible to commercialize tools, among others modified disc milling cutters and grinding discs.

What is claimed is:

1. Method for machining bevel gears with a C-axis and a base pitch, said bevel gear comprising teeth having a head and flanks with a certain profile, said flanks comprising left flanks and right flanks, at least part of said left flanks and part of said right flanks being milled with a disc milling cutter comprising a single milling head, said milling head having a milling head tooth, the said left flanks being milled at a different time than the said right flanks, the bevel gear to be machined being rotated by a predefined angle between the milling process of at least one of said left flanks and the milling process of at least one of said right flanks, said predefined angle being not a multiple of said base pitch, said profile of said flanks being corrected through an angular displacement of said machined bevel gear and/or through an axial displacement of said milling cutter.

2. The method of claim 1, wherein said predefined angle corresponds to half of said base pitch.

3. The method of claim 2, wherein the inclination of the axis of the disc milling cutter remains unchanged during the milling process of said bevel gear.

4. The method of claim 3, wherein the axis of the disc milling cutter remains vertical during the milling process of said bevel gear.

5. The method of claim 1, wherein in a first step all said left flanks are milled; wherein said machined bevel gear is rotated by said predefined angle, and wherein all said right flanks are milled in a second step.

6. The method of claim 1, wherein in a first step all said right flanks are milled, wherein said machined bevel gear is rotated by said angle, and wherein all said left flanks are milled in a second step.

7. The method according to claim 1, wherein each gap of the bevel gear is milled one after the other.

8. The method of claim 1, wherein said disc milling cutter is displaced axially by a predefined distance between said milling processes of at least one of said left flanks and the milling process of at least one of said right flanks.

9. The method of claim 8, wherein said predefined distance equals the width of said milling head tooth in the pitch circle.

10. The method of claim 1, wherein said profile is corrected through a displacement of said machined bevel gear.

11. The method of claim 10, wherein said teeth are machined in longitudinal crowning through an additional angular displacement of said C-axis of said machined bevel gear.

12. The method of claim 1, wherein said teeth are corrected through adjusting the disc milling cutter in the area of the head of said teeth.

13. The method of claim 1, wherein the tooth bearing of said teeth are optimized through an additional axial displacement of the milling head and an additional rotational movement of the work piece.

14. Method for machining bevel gears with a C-axis and a base pitch, said bevel gear comprising teeth having a head and flanks with a certain profile, said flanks comprising left flanks and right flanks, at least a part of said left flanks and part of said right flanks being milled with a single disc milling cutter comprising a milling head, said milling head having a milling head tooth, the said left flanks being milled at a different time than the said right flanks, the bevel gear to be machined being rotated by a predefined angle between the milling process of at least one of said left flanks and the milling process of at least one of said right flanks, said predefined angle being not a multiple of said base pitch α, said disc milling cutter being displaced axially by a distance equals the width of said milling head tooth in the pitch circle between the milling process of at least one of said left flanks and the milling process of at least one of said right flanks, said profile of said flanks being corrected through an angular displacement of said machined bevel gear and/or through an axial displacement of said disc milling cutter.

15. Data carrier wherein a software program is stored that can be executed by data processing means in a milling machine in order to carry out the method of one of the claims 1 to 14.

* * * * *